US006688770B1

(12) United States Patent
Schottdorf et al.

(10) Patent No.: US 6,688,770 B1
(45) Date of Patent: Feb. 10, 2004

(54) ROLLING BEARING UNIT WITH ABS CAPABILITY IN A PROTECTIVE ARRANGEMENT AND A PROTECTION CAP OR PROTECTION COVER

(75) Inventors: Johannes Schottdorf, Hammelburg (DE); Roland Werb, Riedbach (DE); Roland Langer, Schwanfeld (DE); Rainer Breitenbach, Gochsheim (DE)

(73) Assignee: FAG Automobiltechnik AG (DE)

( * ) Notice: Subject to any disclaimer, the term of this patent is extended or adjusted under 35 U.S.C. 154(b) by 0 days.

(21) Appl. No.: 09/857,230

(22) PCT Filed: Sep. 28, 2000

(86) PCT No.: PCT/DE00/03382

§ 371 (c)(1),
(2), (4) Date: Sep. 10, 2001

(87) PCT Pub. No.: WO01/25799

PCT Pub. Date: Apr. 12, 2001

(30) Foreign Application Priority Data

Oct. 1, 1999 (DE) .......................................... 199 47 157

(51) Int. Cl.⁷ ............................................. F16C 19/08
(52) U.S. Cl. ...................................... 384/446; 384/448
(58) Field of Search .................................. 384/448, 446, 384/544, 589; 324/174

(56) References Cited

U.S. PATENT DOCUMENTS 5,760,576 A * 6/1998 Ouchi .......................... 384/448

FOREIGN PATENT DOCUMENTS

EP 0919813 6/1999

\* cited by examiner

*Primary Examiner*—Lenard A. Footland
(74) *Attorney, Agent, or Firm*—Ostrolenk, Faber, Gerb & Soffen, LLP

(57) ABSTRACT

The invention relates to a protective arrangement with a rolling bearing unit with ABS capability which has a structurally integrated angle transmitter. The angle sensor is connected to a rotatable bearing ring so that it can rotate and has permanent magnet poles for coupling with an external sensor. The invention includes a weak magnetic cover which is located on the rolling bearing unit at a distance from the angle transmitter in such a way that a magnetic shield is formed between the angle transmitter and the environment outside.

12 Claims, 1 Drawing Sheet

Figure 1:
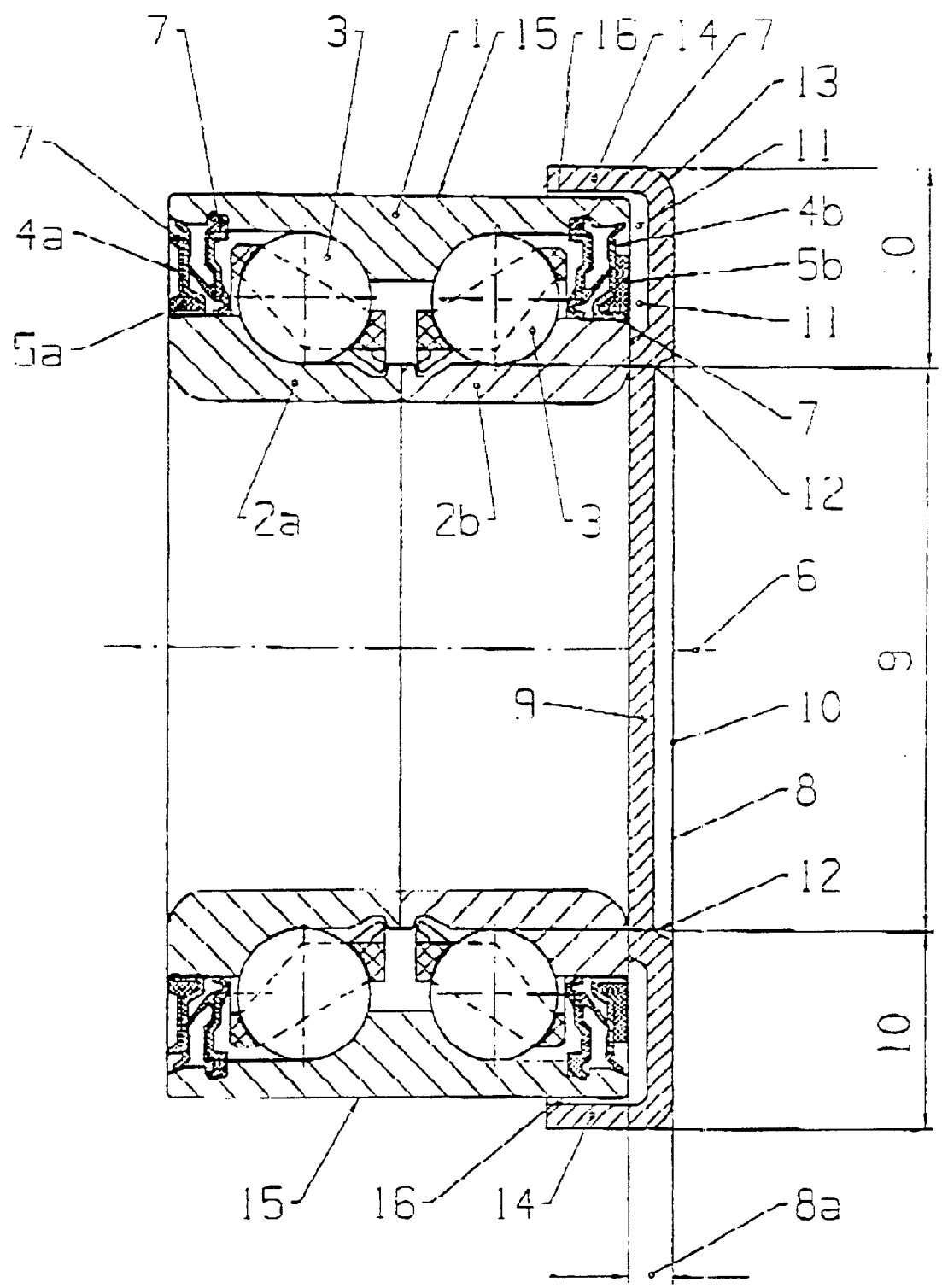

ROLLING BEARING UNIT WITH ABS CAPABILITY IN A PROTECTIVE ARRANGEMENT AND A PROTECTION CAP OR PROTECTION COVER

The invention relates to a protective arrangement with a rolling bearing unit with ABS capability that has a structurally integrated angle transmitter that is connected to a rotatable bearing race or rolling-element race so that it can rotate and has permanent magnet poles for coupling with an external sensor. Said protective arrangement is in the form of a protective cap or protective hood.

The use of a "pulse seal, on non-driven passenger-car wheels for the purpose of implementing ABS is known (cf Heinrich Hofinann and Oswald Bayer "ABS-fähige Radlager"[Wheel Bearings with ABS Capability], preprint from "Wailzlagertechnik—Industrietechnik" [Rolling Bearing Systems—Industrial Engineering] 1990 by FAG Kugelfischer, Schweinfurt). Here, the seal rotates with the wheel, a sheet- metal insert in the seal being provided with apertures, thereby allowing pulses to be derived electromagnetically in accordance with the angular position and speed of rotation. This angular pulse generator or encoder integrated into the rolling bearing unit is a significant functional component of the anti-lock brake system (ABS) of the vehicle and is therefore relevant to safety. Current ABS angle transmitters integrated into the wheel bearing are constructed from [[strong]] hard magnetic material to form a multiplicity of permanent magnet poles. When storing and transporting corresponding rolling bearing units with ABS capability, care should therefore be taken to ensure that the angle transmitter is not exposed to interfering external magnetic fields, which give rise to faults in magnetic angle encoding and can thus cause accidents when driving. Contamination of the environment within which the angle transmitter is installed by foreign bodies should moreover be prevented.

The object on which the invention is based is thus to increase the reliability and safety of rolling bearing units with ABS capability from the technical point of view when storing and transporting them. This should be accomplished with a minimum of outlay on construction, additional weight and space, ease of handling and assembly being desired at the same time.

To achieve this object in the case of a protective arrangement with the features stated at the outset, the invention proposes to arrange a [[weak]] soft magnetic cover on the rolling bearing unit at a distance from the angle transmitter in such a: way that a magnetic shield is formed between the angle transmitter and the environment outside. The [[weak]] soft magnetic material of the cover according to the invention prevents intruding external magnetic fields and thus protects the angle transmitter installed in the rolling bearing unit from external magnetic fields in a simple, effective and economical manner. Protection is furthermore also provided against ferrite contamination and other types of contamination. When the time comes to install the rolling bearing unit in the motor vehicle, the protective cover according to the invention can be handled easily and removed quickly. It can be configured not only as a disposable item but can also easily be configured to be reusable, allowing a single protective cover to be used for the storage and transportation of a large number of rolling bearings with ABS capability. Overall, this increases the economic viability of the ABS rolling-bearing protection system according to the invention.

In many cases, bearing races are formed from steel or some other ferromagnetic material. In this regard, a development of the invention proposes that the [[weak]] soft magnetic cover should be arranged in direct contact with one or both of the opposite bearing races. The interfering external magnetic fields can be diverted past the angle transmitter with greater reliability. Another advantage of this development is that one or both bearing races serve as a bearing surface for the shielding cover, ensuring defined positioning of the shielding cover on the rolling bearing unit.

It is within the scope of the invention that there should be a clearance or space, filled with air or some other nonmagnetizable substance, between the [[weak]] soft magnetic cover and the angle transmitter to ensure that effective magnetic shielding without disruption by external magnetic fields is achieved. This is taken into account by an advantageous development of the invention, according to which the shielding cover is arranged with an air gap relative to the angle transmitter and its installation space. It is particularly expedient if this air gap is formed between the annular space bounded by the two bearing races and the shielding cover.

Handling and transportation are easier if, in accordance with another development, the [[weak]] soft magnetic cover is secured on the rolling bearing unit by means of a flexible wrapping, e.g. a plastic film. This can be wound completely or partially around the rolling bearing unit and the shielding cover and can thus be useful in addition for keeping out dirt particles.

To enable the shielding cover to be mounted on the rolling bearing unit and released from it quickly, the shape of a hood or cap is expedient for the cover, an approximately hollow-cylindrical inner wall having a diameter that is greater than an external extent of the rolling bearing, in particular of an outer circumference or outer race. The shielding cover or protective cap or hood can thus be mounted on and removed from the rolling bearing unit easily. The protective cap or hood can be fixed in its position by means of the above-mentioned plastic film or packaging inserts in a packing carton.

The general inventive idea includes within its scope a specific configuration of the protective cap or hood for the protective arrangement explained above with a rolling bearing unit with ABS capability. For the purpose of achieving the object mentioned at the outset, the protective cap or hood is distinguished by the fact that it is produced from [[weak]] soft magnetic, as far as possible highly permeable, material and has a rotationally symmetrical end wall, the outline or diameter of which is dimensioned to cover and shield one side or end of the rolling bearing unit. In axial section, the protective cap or hood is, according to the invention, divided into a central part and a rim component, which surrounds said central part in the manner of a ring and is offset parallel to the axis. The central part is intended to be congruent with the inner race of the rolling bearing, while the rim component serves to cover the outer race and an annular space between the inner and the outer race of the bearing. The angle transmitter to be shielded is expediently installed in the annular space. In rolling bearing units, the central part of the end wall is particularly suited to being placed in contact with the inner bearing race for the purpose of positioning the protective cap or hood, while the ring- type rim component then has a clearance with respect to the annular installation space of the angle transmitter owing to its cranked offset parallel to the axis. The resulting air gap between the annular installation space of the angle transmitter in the rolling bearing and the inside of the protective cap or hood effectively promotes shielding against external magnetic fields.

The hollow-cylindrical circumferential wall into which the end wall of the protective cap or hood merges is advantageously dimensioned with an inside diameter that leads to the formation of a clearance relative to the outer circumference of the rolling bearing unit. This allows the protective cap or hood to be mounted on or removed from the rolling bearing unit extremely quickly. It is important that the protective cap or hood is produced from highly permeable material, e.g. [[weak]] soft magnetic sheet iron with as low a carbon content as possible, at least in the zone or section that is intended to be congruent with the location of installation of the angle transmitter. In contrast, the central zone, which is not intended to lie opposite the angle transmitter, can have through cutouts or apertures and/or be formed by plastic.

Further details, features, advantages and effects based on the invention will become apparent from the subclaims and the following description of a preferred exemplary embodiment and from the accompanying drawing. FIG. 1 shows an axial longitudinal section through a rolling bearing unit with ABS capability and a protective hood arranged on it:

The rolling bearing unit is formed as a bearing with an outer race 1 and a two-part inner race having a first inner-race component 2a and a second inner-race component 2b. Rolling elements 3 revolve between the outer race 1 and the inner races 2a, 2b. In the exemplary embodiment, the two inner-race components 2a, 2b are provided for the purpose of rotating. To increase the life of the bearing, the spaces between the inner and outer races are each sealed at both ends by a respective lip seal 4a, 4b. These each have a seal component 5a, 5b that is fixed on the outer circumference of the respective inner-race component 2a, 2b and thus accompany the rotation of the inner-race components 2a, 2b about the center line 6 of the bearing. The two said seal components 5a, 5b are arranged on the outside at the ends, adjacent to the outer edge of the inner race 2a, 2b. As known per se, the seals can be composed of an elastomer reinforced with sheet-metal inserts 7.

An angle encoder is structurally integrated into one of the seal components 5a, 5b arranged at the ends, according to the drawing into the outer seal component 5b situated in the right-hand half of the rolling bearing unit (being surrounded and covered by the elastomer of the seal). As known per se, the angle encoder is constructed from a multiplicity of magnet pole pairs, e.g. twenty-four magnet pole pairs. To shield the angle encoder and the outer seal component 5b surrounding the latter, a protective hood 8 is placed over the corresponding end of the rolling bearing unit. The end wall 8a of the protective hood 8 is divided into a central part 9, the inside of which rests against the facing end of the inner race component 2b, the latter being on the right in the drawing, and a rim component 10, which surrounds the central part 9 in the manner of a ring. Said component 10 lies opposite the outer seal component 5b having the angle encoder and opposite the facing of the outer race 1 with a clearance in between that results in an air gap 11 that assists the shielding of the angle encoder. This is formed by virtue of the fact that, at the end wall 8a of the protective hood 8, the ring-type rim component 10 is set back from the bearing unit relative to the central part 9 of the end wall 8a, parallel to the center line 6 of the bearing. This results in an offset 12, which forms the boundary between the central part 9 and the rim component 10 of the end wall 8a.

The end wall 8a of the protective hood or rim component 10 of the latter ends in a bend 13, which corresponds approximately to an angle of 90°, for example, and leads into a hollow-cylindrical circumferential wall 14. Its inside diameter is dimensioned in such a way that there remains an annular gap or clearance 16 with respect to the outer circumference 15 of the outer race 1, allowing the protective hood 8 to be mounted on and removed from the bearing unit quickly and easily.

List of reference numerals

1 Outer race
2 2a first inner-race component
2b Second inner-race component
3 Rolling elements
4a Lip seal
4b Lip seal
5a Seal component
5b Seal component
6 Center line of bearing
7 Sheet-metal insert
8 Protective hood
8a End wall
9 Central part
10 Rim component
11 Air gap
12 Offset
13 Bend
14 Circumferential wall
15 Outer circumference
16 Annular gap or clearance

What is claimed is:

1. A protective arrangement comprising:
   a rolling bearing unit with ABS capability;
   a structurally integrated angle transmitter that is connected to a rotatable bearing race so that it can rotate and has permanent magnet poles for coupling with an external sensor, wherein the angle transmitter is installed in an annular space between two opposite bearing races of the rolling bearing unit; and
   a cover made at least partially of a soft magnetic highly permeable material that is located on the rolling bearing unit at a distance from the angle transmitter in such a way that a magnetic shield is formed between the angle transmitter and the environment outside, wherein the cover made of the soft magnetic material is arranged with an air gap relative to the angle transmitter and the annular installation space.

2. The protective arrangement as claimed in claim 1, wherein
   the rolling bearing unit comprises at least two opposite bearing races, and
   the cover is made of a soft magnetic sheet iron with low carbon content and is arranged in direct contact with one or both of the bearing races.

3. The protective arrangement as claimed in claim 1, wherein the cover is arranged with a clearance relative to an outer circumference or outer race of the rolling bearing unit.

4. The protective arrangement as claimed in claim 1, wherein
   the rolling bearing unit comprises at least two opposite bearing races with ferromagnetic material, and
   the cover is arranged in magnetic effective connection with one or both of the bearing races.

5. The protective arrangement as claimed in claim 1, further comprising a flexible wrapping that surrounds the rolling bearing unit and the cover.

6. The protective arrangement as claimed in claim 1, wherein
   the angle transmitter is installed between an inner and an outer race at one end of a rolling bearing unit, and
   the cover is designed and arranged to cover the end.

7. The protective arrangement as claimed in claim 6, wherein the cover surrounds at least the end of the outer race and, by means of a bend, surrounds at least part of the outer circumference of the outer race.

8. The protective arrangement as claimed in claim 6, wherein the cover is a protective cap or hood and is mounted on the end of the rolling bearing unit.

9. A protective cap or hood for a protective arrangement with a rolling bearing unit with ABS capability as claimed in claim 8, further comprising:

a rotationally symmetrical end wall produced with a soft magnetic material, the outline or diameter of which is dimensioned to cover and shield one side or end of the rolling bearing unit, and the axially sectioned profile of which is divided into a central part associated with an inner bearing race and a rim component, which surrounds said central part in the manner of a ring, is offset or cranked parallel to the axis and is associated with the respective end of an outer bearing race and an annular space between the inner and the outer race.

10. The protective cap or hood as claimed in claim 9, wherein the end wall merges into a hollow-cylindrical circumferential wall, the inside diameter of which is dimensioned to form a clearance relative to the outer circumference of the rolling bearing unit.

11. The protective cap or hood as claimed in claim 9, wherein the central part of the end wall has an aperture, which is provided and arranged to ensure common alignment with a bearing bore of the rolling bearing unit.

12. The protective cap or hood as claimed in claim 9, wherein the central part of the end wall has a central zone that is composed of nonmagnetizable material and is dimensioned to cover a bearing bore of the rolling bearing unit.

* * * * *